Feb. 26, 1924.

S. G. BEZAURY

CLUTCH RELEASE FOR TRACTORS

Filed May 24, 1922

INVENTOR
S. G. Bezaury
BY Victor J. Evans
ATTORNEY

WITNESSES

Feb. 26, 1924.
S. G. BEZAURY
1,484,929
CLUTCH RELEASE FOR TRACTORS
Filed May 24, 1922
2 Sheets-Sheet 2
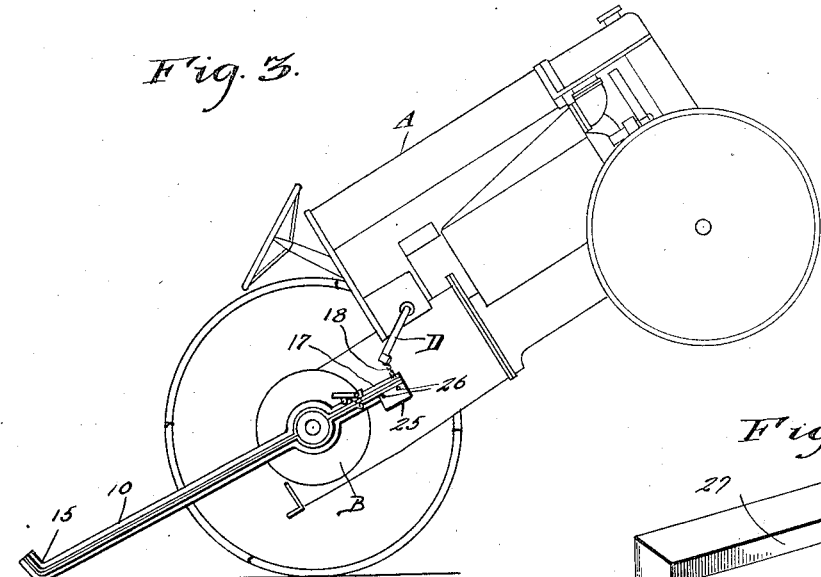
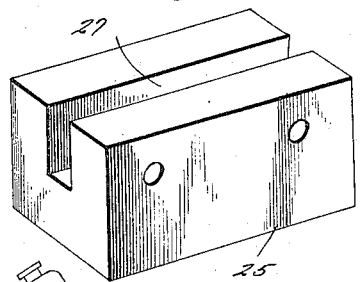
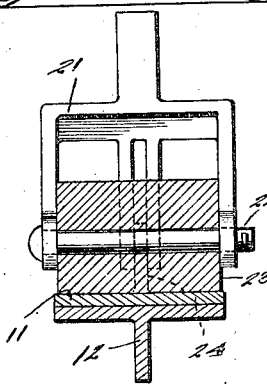
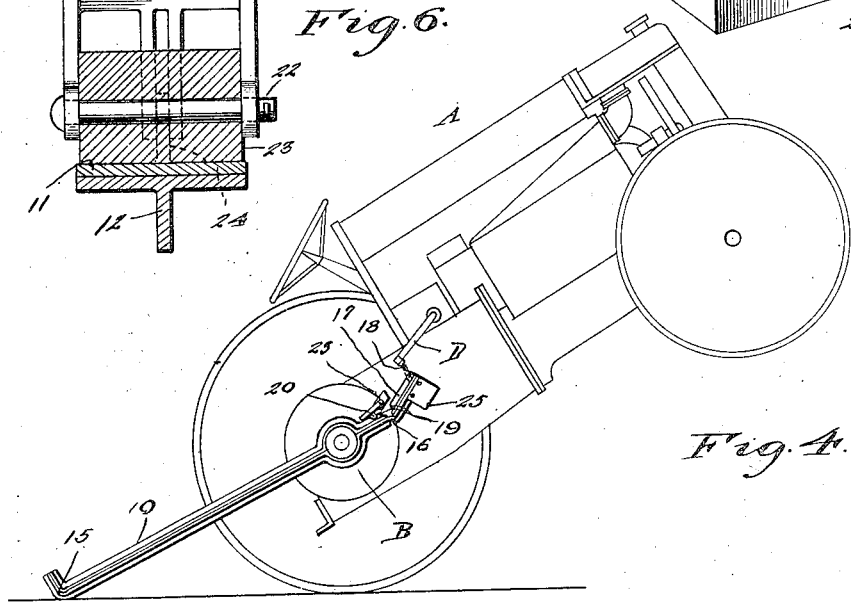
S. G. Bezaury INVENTOR
BY Victor J. Evans ATTORNEY
WITNESSES Patented Feb. 26, 1924.

1,484,929

UNITED STATES PATENT OFFICE.

SALVADOR G. BEZAURY, OF MUSKEGON HEIGHTS, MICHIGAN.

CLUTCH RELEASE FOR TRACTORS.

Application filed May 24, 1922. Serial No. 563,357.

*To all whom it may concern:*

Be it known that I, SALVADOR G. BEZAURY, a citizen of the United States, residing at Muskegon Heights, in the county of Muskegon and State of Michigan, have invented new and useful Improvements in Clutch Releases for Tractors, of which the following is a specification.

This invention relates to attachments for tractors, particularly to those known as the Fordson, and has for its object the provision of a device designed to be mounted upon a tractor of this type for automatically throwing out the clutch in the event that the tractor rears when an overload occurs.

It is well known that tractors, particularly of the above mentioned type will rear up and turn over backwards in case the drive wheels become stuck and this action takes place so rapidly that the operator has no time to disengage the clutch or leave his place and the result is that operators are frequently killed or at least seriously injured. It is with these various facts in view that I have designed the present clutch release device which operates automatically and which is thus a great safety device.

An important object is the provision of an attachment of this character which will be simple and inexpensive in manufacture, easy to apply, efficient and durable in service and a general improvement in the art.

With the above and other objects and advantages in view the invention consists in the details of construction to be hereinafter more fully described and claimed and illustrated in the accompanying drawings, in which:

Figure 3 is a side elevation showing the device in its clutch releasing position, Figure 4 is a similar view showing the release lever operated, Figure 5 is a detail perspective view of a counterbalancing weight which may be used and Figure 6 is a cross section on the line 6—6 of Figure 2.

Figure 1:
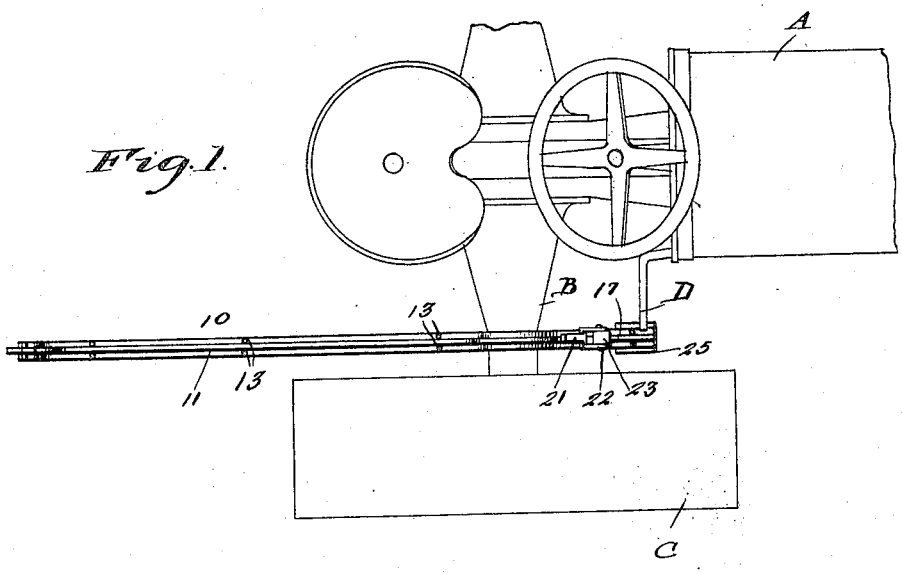
Figure 1 is a plan view of a portion of a tractor showing my device applied.
Figure 2:
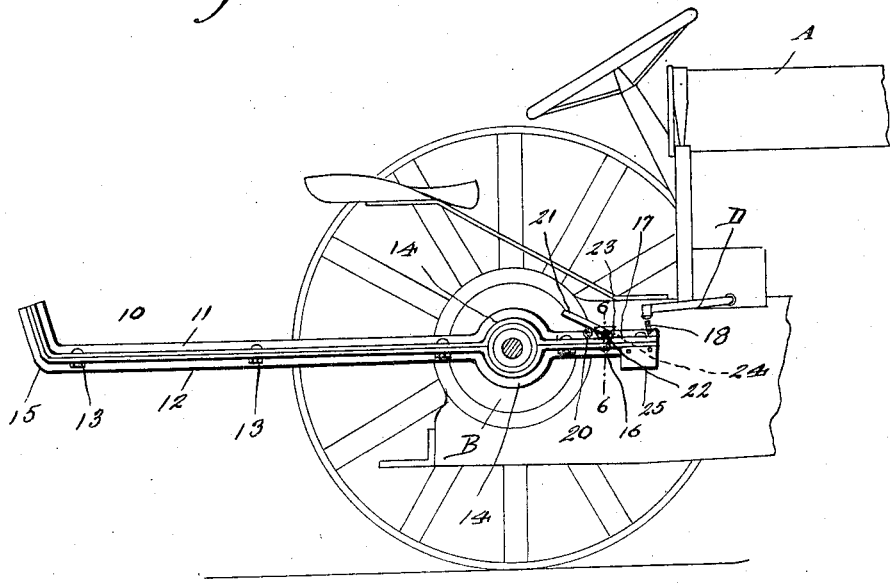
Figure 2 is a side elevation.

Referring more particularly to the drawings the letter A designates a portion of a tractor, B designates the rear axle housing, C one of the rear wheels, and D the clutch lever.

In carrying out my invention I provide a clutch release device which comprises a lever 10 formed of two sections 11 and 12 of T iron or angle iron bolted together as shown at 13. Intermediate their ends these sections are formed with mating curved portions 14 which embrace the rear axle housing with sufficient looseness to permit pivotal movement of the lever. The rear end of the lever is extended at an angle as shown at 15, the angle being preferably 30° from the horizontal so that in case the tractor rears and the rear end of the lever engages the ground it will do so flatly to avoid digging into the ground.

Hinged at 16 upon the forward end of the lever 10 is a short section 17 which has its forward end connected by a chain 18 with the rear end of the clutch lever D. The webs of the lever are cut away adjacent the hinge 16 as shown at 19 so as to permit upward swinging movement of the rear portion at the hinge joint.

Pivoted at 20 upon the lever 10 is a release angle lever 21 which has its forward end forked and pivoted at 22 upon opposite sides of a block 23 which is formed in opposite sides with recesses 24 receiving the cut ends 19 of the angle iron webs for the purpose of holding the lever rigid at the hinge joint.

If preferred I may provide a counterbalancing weight 25 bolted onto the web of the lowermost element 17 as shown at 26, this weight being formed with a longitudinal slot 27 receiving the web.

In the operation of the device it will be seen that the lever 10 extends rearwardly beyond the rear axle housing of the tractor but does not at all interfere with the action of the clutch lever D in the usual manner owing to the fact that the counterbalancing weight 25 takes off any strain which might otherwise come upon the chain 18. Normally the lever 21 is in such position that the block 23 holds the hinge 16 rigid. In the event that the tractor should rear or tip backwardly the angular end 15 of the lever will engage the ground when the tractor has tilted to a dangerous angle. As the tractor continues to rear the lever 10 will pivot upon the rear axle housing so that a downward pull will be effected on the clutch lever D through the instrumentality of the chain 18. This movement of the lever D will throw out the clutch of the tractor mechanism so that it may right itself gravitationally, the clutch, however, being still held out. To restore everything to normal position it is merely necessary to press upon the release lever 21 so as to lift the block 23 out of engagement with the webs which will permit pivotal movement at the hinge 16. The clutch release device will then take care of itself, swinging back to normal or horizontal position owing to the provision of the counterbalancing weight.

From the foregoing description and a study of the drawings it will be apparent that I have thus provided a simply constructed and consequently inexpensive safety device for automatically throwing out the clutch when a tractor rears, thus preventing injury to or loss of life of the operator. Owing to the simplicity of the construction and the fewness of the parts it is apparent that there is nothing to get out of order and that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A clutch release device for tractors comprising a lever formed of sections embracingly engaged upon the rear axle housing of a tractor and capable of pivotal movement thereon, the rear end of the lever being extended angularly, the forward end of the lever being flexibly connected with the clutch lever of the tractor, a counterbalancing weight on said forward end, a hinge joint in the lever between the rear axle housing and the forward end, means normally holding said hinge joint rigid and a lever for releasing said holding means.

In testimony whereof I affix my signature.

SALVADOR G. BEZAURY.